Sept. 10, 1946.　　　　R. W. MANN ET AL　　　　2,407,613
COMPRESSED AIR-DRIVEN DRILL
Filed Dec. 21, 1943　　　2 Sheets-Sheet 2

Inventors
R.W. Mann
By R.C. Wiles
Attorneys

Patented Sept. 10, 1946

2,407,613

UNITED STATES PATENT OFFICE 2,407,613

COMPRESSED-AIR DRIVEN DRILL

Reginald William Mann, Monkseaton, and Robert Clough Wiles, Newcastle-on-Tyne, England, assignors to Victor Products, (Wallsend) Limited, a British company Application December 21, 1943, Serial No. 515,136
In Great Britain January 25, 1943

2 Claims. (Cl. 121—34)

This invention relates to rotary drills of the kind comprising a compressed-air motor. Drills with motors of the type having a rotor with sliding vanes turning about an eccentric axis in its cylinder have been used in the engineering industry, but hitherto they have not been found satisfactory for use, particularly in mines or quarries, mainly because of inadequate lubrication of the motor, and/or the excessive escape of air and moisture into the gearing.

In drills of this character hitherto used lubrication has been effected by providing an oil reservoir in the casing of the drill with a Venturi-type connection to the main compressed-air supply so that oil is entrained in the current of air. It has been found, however, that only a very small proportion of this oil reaches the parts most in need of lubrication, namely the vanes and the slots in the rotor in which they slide, the bulk of the oil being blown out with the exhaust air and wasted. In consequence the oil in the reservoir is quickly used up and requires frequent renewal.

It is usual in such drills to by-pass a small proportion of the air to a recess in the end plate of the rotor for the purpose of pushing the vanes outwards in their slots, particularly during starting when centrifugal force is not in action or is insufficient to keep the vanes pressed outwards. We have now found that by supplying an adequate proportion of lubricant to such by-passed air only, and no lubricant to the main body of air which serves to operate the motor, efficient lubrication can be insured while lubricant is conserved, and the drill can be used for a much longer time without requiring re-charging with lubricant.

It is the principal object of the invention therefore to provide a rotary drill of the type employing a motor of the sliding vane type actuated by compressed air, with means for feeding lubricant to a small proportion only of such compressed air, and with passages for conveying the air charged with lubricant to the motor in a position such that it acts to press the vanes outwardly as the rotor of the compressed air motor turns in its casing.

A further object is to provide convenient means for controlling the proportion of the air by-passed from the main supply of compressed air, and for regulating the degree to which said by-passed air is saturated with lubricant.

A still further object is to restrict the passage of compressed air from said motor into the gear box enclosing the gears through which the drill chuck is driven, and to provide convenient means for venting said gear box to prevent appreciable rise of pressure therein while avoiding entry of foreign matter from outside.

With these and other objects in view the drill forming the subject of this invention has been designed and constructed substantially in the manner illustrated in the accompanying drawings wherein.

Figure 1:
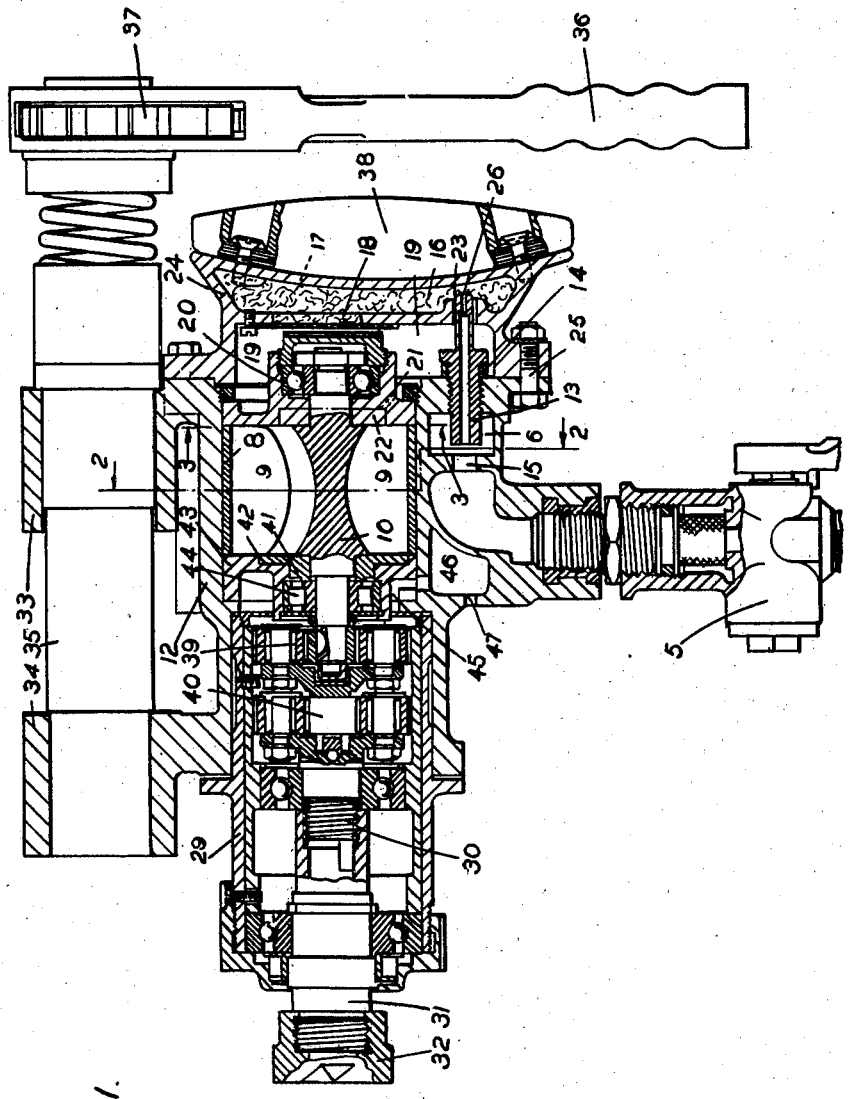
Figure 1 is a longitudinal sectional elevation of a compressed air drill showing the oil reservoir and other features of the invention applied thereto.
Figure 2:
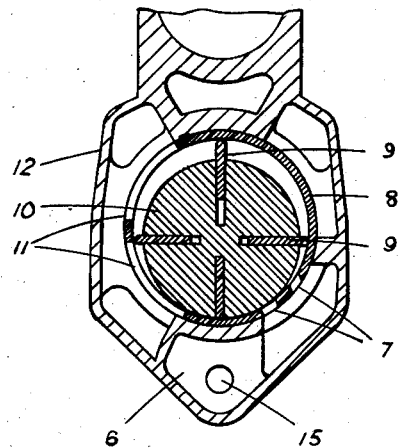
Figure 2 is a cross section on the line 2—2 of Figure 1, looking toward the left.

Referring to the drawings; the drill illustrated is of a type in which compressed air is supplied through a cock 5 to a cavity at 6 in the motor casing 12, whence it passes through ports at 7 in the cylinder liner 8 to the working space of a vane motor. This consists of a rotor 10 with vanes 9 operating in radial slots therein as usual, the rotor being eccentrically arranged in its cylinder. The exhaust of used air takes place through slots at 11 in the other side of the liner 8. The air reaches the cavity 6 through an aperture at 15 in a partition wall and the rate at which the air can pass this aperture is controlled by a plug member 13 which screws into the outer wall of the cavity 6 and can be adjusted to come nearer to or further from the aperture 15 by using washers or collars 14 of different widths between the head of the plug member 13 and the wall into which it screws. This adjustment is made when the purpose for which the drill will be used is determined, namely according to whether it is required for stone, hard coal or soft coal and the like, and before the flanged casing 24 is secured by bolts 25 to the motor casing 12. The setting of the plug 13 by its collar 14 limits the range of air admission, and consequently the maximum drilling speeds as is required for the different materials to be drilled, and the different forms of bits used for each of these materials.

Figure 3:
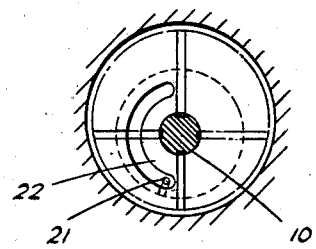
Figure 3 is a view of the righthand end plate of the motor.

A small proportion of the air supplied to the drill is directed through the central bore of plug 13 and a reduced bore at 26 to a compartment 16 which is filled with absorbent material such as gauze or cotton wool soaked with oil. The oil is supplied as required through a filling aperture at 17. The air charged with oil passes through a perforated strainer 18 to a chamber 19 which surrounds the ball bearings 20 supporting the outer end of the motor spindle. From this chamber the air carrying oil in suspension passes through a passage at 21 to a sector-shaped recess at 22 in the end wall of the rotor casing (see Figure 3) so that this air may reach the bottoms of the slots in which the vanes 9 work, and thus keep them forced outwardly as the rotor 10 turns. It is not found necessary for lubricating the motor to impregnate with oil even the whole of the air fed in this way to the recess 22 and the inner ends of the vanes 9, and some air may be by-passed from the point of entry to chamber 16 around the end of the plug member 13, where a gap is shown at 23, leading into the chamber 19. This by-passed air practically picks up no oil from the absorbent pad in chamber 16 as it flows out around its point of entry.

Figure 4:
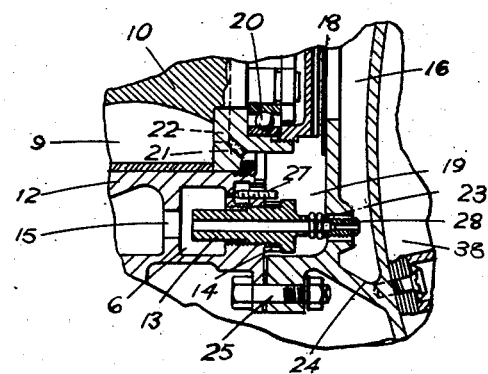
Figure 4 shows a modification of a part of the motor casing in longitudinal section.

Additional adjustable means for by-passing air may be provided if desired, as shown in Figure 4, where 27 represents a needle valve adjustable from the outside before the casing 24 containing the compartments 16 and 19 is assembled on the drill, for permitting air to be bypassed directly from cavity 6 to the chamber 19. In this case also the end 28 of plug 13 is shown as a separate fitting so that its size and bore can be determined according to the amount of air which is needed to be impregnated with oil for lubricating the motor.

The rotor shaft is connected to epicyclic reduction gears 39, 40 in gearbox 29, the drive being transmitted through the spindle 30 coupled to the shaft 31 which carries the chuck 32 for the drill bits as usual. The drill is shown as being provided with lugs 33 and 34 for the stem 35 of the force feed mechanism which is used when the drill is mounted on a braced support and fed up to its work by a ratchet feed 37 operated by a handle 36 in the well known way. The drill also has a rubber shoulder pad 38 attached to the face of compartment 16 for use when the drill is manipulated by hand.

Leakage of air from the motor into the gearbox 29 is largely minimised by providing the rotor 10 with a disc or baffle 41 which turns with the rotor in a recess at 42 in the end cover 43 surrounding the ball bearing 44. The clearances between the baffle 41 and the recess in which it turns can be made very small so that very little air can pass through into the gearbox. Any substantial rise of pressure in the gear box is prevented by venting it through a passage 45 into a compartment 46 in the rotor casing, which in turn is vented to the outside through a hole at 47. This avoids any risk of dirt entering the gearbox through the venting aperture.

It will be evident that many details of the construction illustrated can be varied according to the type of drill to which the invention is applied.

We claim:

1. In a rotary drill adapted to be driven by compressed air, the combination of a rotor with a plurality of radial slots therein, vanes adapted to slide radially of the rotor one in each slot thereof, a surrounding casing with end walls and an internal circumferential wall disposed eccentrically to said rotor and in which the vanes of the rotor are adapted to slide, an inlet for compressed air, a compartment associated with said casing adapted to contain an absorbent material soaked in lubricant fluid, an adjustable plug member associated with said compressed air inlet and adapted to be set in such a manner as to control the rate at which compressed air can enter said casing, a passage through said plug member leading to said compartment and adapted to by pass a small proportion of the compressed air into the said compartment, a passage leading from said compartment to a recess in one end wall of said surrounding casing adjacent the bases of said slots in said rotor in which said vanes are mounted to slide, said recess being so disposed as to permit compressed air soaked with lubricant from said compartment to enter said slots in the rotor, to press out said vanes radially in said slots, and to apply lubricant thereto as the rotor turns in its casing.

2. In a rotary drill as claimed in claim 1, an additional passage and an adjustable valve therein adapted to permit an additional portion of compressed air from said inlet to pass to said recess in the end wall of said casing without passing through said compartment.

REGINALD WILLIAM MANN.
ROBERT CLOUGH WILES.